United States Patent
Huang

Patent Number: 6,151,013
Date of Patent: Nov. 21, 2000

[54] ELECTRICAL PROBE-POSITION SENSOR

[75] Inventor: Jianming Huang, Round Rock, Tex.

[73] Assignee: Sentech, Windham, N.H.

[21] Appl. No.: 08/963,420

[22] Filed: Nov. 3, 1997

[51] Int. Cl.[7] ............................................. G09G 5/00
[52] U.S. Cl. .................... 345/173; 178/18.03; 178/18.05
[58] Field of Search .............................. 345/173, 178, 345/179, 156, 174; 178/18.01, 18.03, 18.05; 338/68

[56] References Cited

U.S. PATENT DOCUMENTS

| | | |
|---|---|---|
| 2,900,446 | 3/1959 | Mclaughlin et al. . |
| 3,522,664 | 8/1970 | Lambright et al. . |
| 3,798,370 | 3/1974 | Hurst . |
| 4,079,194 | 3/1978 | Kley . |
| 4,178,481 | 12/1979 | Kley . |
| 4,214,122 | 7/1980 | Kley . |
| 4,293,734 | 10/1981 | Pepper, Jr. . |
| 4,661,655 | 4/1987 | Gibson et al. . |
| 4,731,508 | 3/1988 | Gibson et al. . |
| 4,822,957 | 4/1989 | Talmage, Jr. et al. . |
| 5,010,213 | 4/1991 | Moriwaki et al. ................. 178/18.05 |
| 5,589,857 | 12/1996 | Tanahashi et al. ................ 345/173 |
| 5,670,755 | 9/1997 | Kwon ................................. 345/173 |
| 5,818,430 | 10/1998 | Heiser .............................. 178/18.05 |

*Primary Examiner*—Bipin H. Shalwala
*Assistant Examiner*—Kent Chang

[57] ABSTRACT

An improved position responsive sensor is disclosed comprising a substrate having first and second parallel, conductive strips at the edges in electrical contact with high resistance coating on the top surface and low resistance coating on the bottom surface respectively. A d. c. voltage is applied to the top surface of substrate, at the same time an a. c. voltage is applied to the bottom surface. An electrical conductive probe or a flexible resistive sheet is used to detected both d. c. and a. c. voltage between the contact point and the ground, whereby the electrical output signals are accurately related to the x and y coordinates of the contacted point on the top surface of substrate.

9 Claims, 2 Drawing Sheets

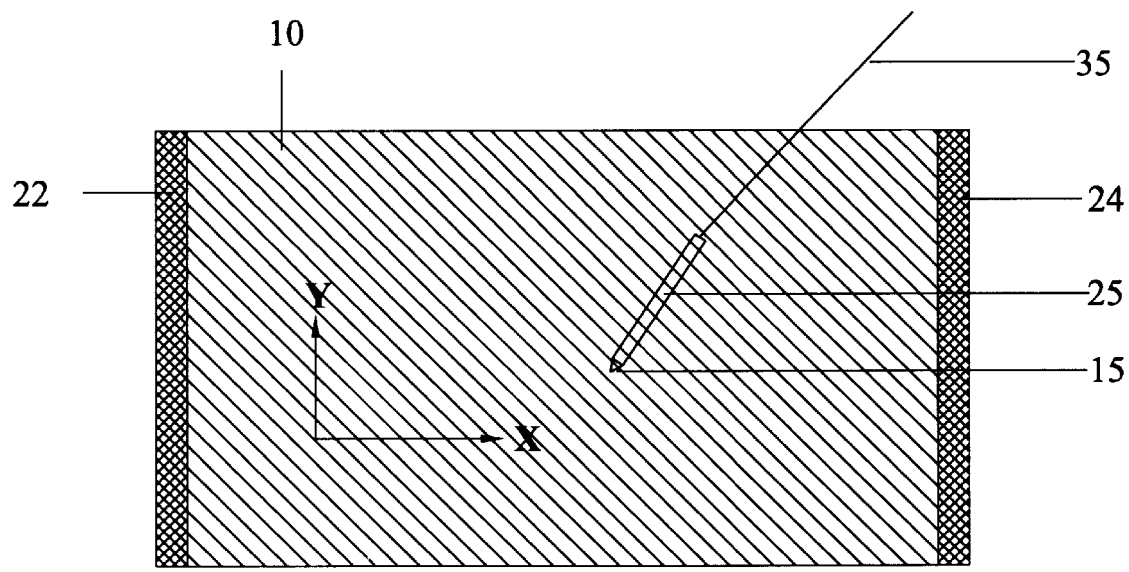
Fig. 1    100
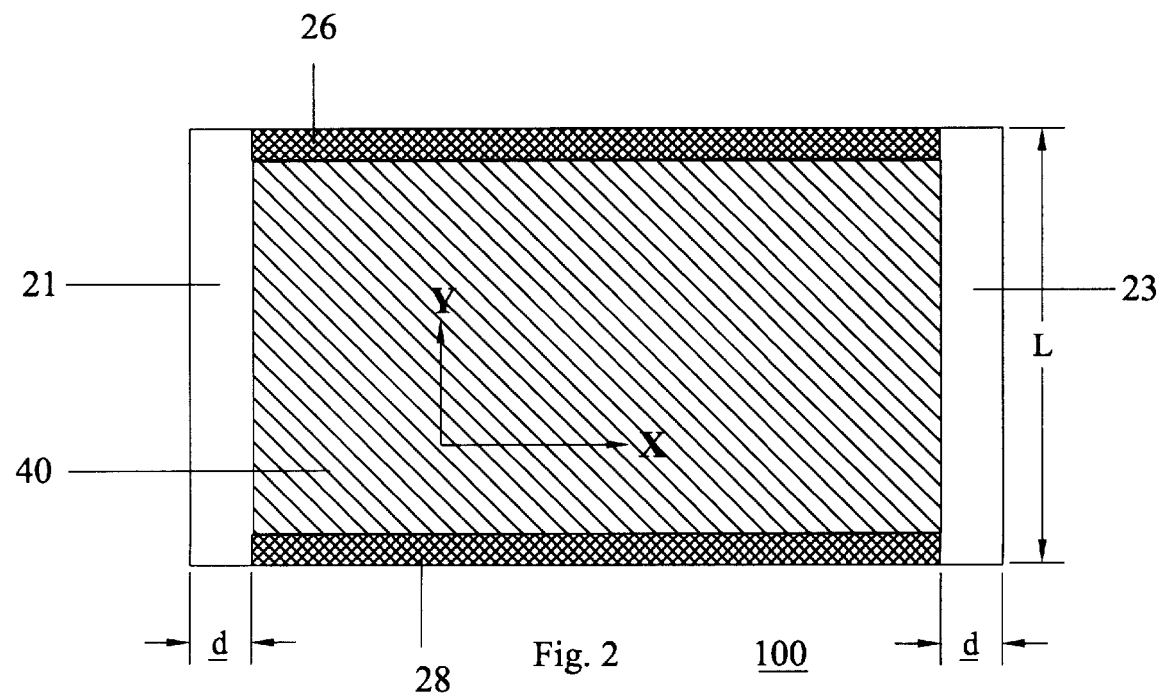
Fig. 2    100

ELECTRICAL PROBE-POSITION SENSOR

TECHNICAL FIELD

The present invention relates to contact sensors, and particularly to such sensors employing single layer resistive panel usable with a contact conductive probe or employing multilayer resistive panel usable with finger or other stylus.

BACKGROUND OF THE INVENTION

Contact sensors, particularly touchscreens are becoming a popular input device for computers. It takes advantage of simple intuitive human response. Applications include information kiosks, point-of-sale equipment, vehicular information and control, and control machinery of all sort, as well as the obvious ones of interacting with computers in word-processing, spread-sheet, and a host of other applications. Many prior art inventions related to this area are disclosed, and several touchscreens are commercially available to date.

Touchscreens used in conjunction with a computer controlled display for interactive information exchange between man and computer functions as position encoder. In order to use the input and display interactively, there must be a direct mapping of positions from one surface to the other. For human user, this relationship is simplified considerably if the two surfaces are coincident. This assumes a one to one mapping scale. Touchscreens were invented to achieve one to one mapping scale by detecting the x and y coordinates of the point on the display touched by a probe, finger or other stylus. There are many kinds of touchcreens utilizing various sensing mechanism such as resistive, capacitive, acoustics and optics. In according with present invention, I will only discuss the resistive touchscreens.

Resistive touchscreen is a transparent type of telescriber shown in U.S. Pat. No. 2,900,446, elecrographic sensor described in U.S. Pat. No. 3,798,370 or contact sensor shown in U.S. Pat. No. 3,911,215, mounted on the top of the display. All these sensors are special devices that generates the electrical signals which are proportional to some physical point in a planar or non-planar coordinates system. Numerous devices have been devised that are acclaimed to solve individual of these and similar applications. One of the earlier of these devices is shown and described in U.S. Pat. No. 2,269,599 to H. C. Moodey. Another of the typical prior art single layer x-y position sensitive devices is that described in a booklet entitled "Information Display Concepts," distributed by Tektronics, Inc. (1968), and referred to as an "x-y tablet." Still another patent as mentioned early is the device described in U.S. Pat. No. 2,900, 446 to D. J. McLaughlen, et al., In all of these devices, continuous electrodes are placed along each edge of a resistive sheet and various means are described for applying voltages between the electrodes to obtain the necessary orthogonal electrical fields. These same electrodes, however, cause severe distortion to the electrical fields during the time interval when they are not connected to the voltage supply. This restricts the use to only a small central region of the resistive sheet for accurate determinations of point coordinates.

The device described in U.S. Pat. No. 3,449,516 to S. H. Cameron, et al., is designed to reduce the field distortion caused by the continuous electrodes. Switching devices are used with each of several discontinuous electrodes to effect application of electric potentials to a resistive sheet. Each electrode is completely isolated from others when no voltage is being applied. Another proposed solution to the problem of distortion is the device described in U.S. Pat. No. 3,591,718 to Shintaro Asano. In his device, the resistive sheet is framed with strips of a material having a lower resistivity than the sheet. The potentials for producing the electrical fields are applied to electrodes at the corners of the frame. The potential at any position along the edge, however, is affected by the quality of the contact between the strips and the sheet and the uniformity of the resistivity of the strips. Still, in order to achieve high linearity throughout a layer area of the device, many more special systems of electrodes have been devised to increase the region of linearity of the instrument. For example, in U.S. Pat. No. 3,798,370 issued to G. S. Hurst on Mar. 19, 1974. Electrodes for the application of the voltage to the sheet arranged in a curve or bow whereby the voltage drops in the resistive element along the edges of the device are at lease partially compensated. In a like manner, special electrode configurations are shown and described in U.S. Pat. No. 4,079,194 on Mar., 14, 1978, in U.S. Pat. No. 4,178,481, on Dec. 11, 1979 and in U.S. Pat. No. 4,214,122, on Jul. 22, 1980 all to V. Klay. In all these patents, special electrodes configurations are used to reduce the bow to increase the sufficiently linear area of given sized sensor. Another patent that describes the special electrode configurations is U.S. Pat. No. 4,293,734, issued to W. Pepper, Jr., on Oct. 6, 1981. This is one of a series of patents issued to Pepper. These electrodes occupy a considerable space along the edge of the sensor. Also, in Pepper the network disclosed combine both the peripheral resistance network and the electrodes for introducing the potential into the resistive layer whereby a change in one effects the other and thus does not provide individual adjustment.

Other patents in trying to improve the linearity of resistive sheet by special electrode configurations are set forth below:

U.S. Pat. No. 4,661,655
U.S. Pat. No. 4,731,508
U.S. Pat. No. 4,777,328
U.S. Pat. No. 4,797,514
U.S. Pat. No. 4,822,957

In addition to these single layer devices, there are known to be many multilayer resistive position touch sensors for generally accomplishing the desired results. When using multilayer system, the contact sensor comprises at lease first sheet of flexible material and second sheet. The first sheet is capable of being energized to establish an electrical potential thereon, or the first flexible sheet functions as a conductive probe. The second sheet can be energized to establish an electrical potential in juxtaposition with the first sheet. To keep the sheet apart, a plurality of substantially uniform discrete insulating spacers are used. For a touchscreen mounting on a display, the flexible sheet and the insulating spacers severely reduce the brightness of display. Also the flexible sheet made from plastic materials can be easily damaged. Further the flexible sheet and the insulating spacers significantly increases the cost of sensor. All these drawbacks make a multilayer touchscreen undesirable. In according with present invention, a preferred embodiment of single layer touchscreen is disclosed.

The multilayer touchscreen does have one special feature over single-layer touchscreen, that is the multilayer sensor is able to sense any of styluses including fingertip. Although touching by a finger is obviously convenient, it also has many unseen disadvantages. For example: 1) the fingertip is too large to accurately touch a small target on the display; 2) touching by a finger usually leaves dirt, water or fingerprint on the screen, this becomes a severe problem in harsh environment; 3) when touching a touchscreen mounted on a movable display such as the one in a lap-top computer, one often is required to hold the display by one hand and use another hand to touch because it is difficult to control the light touch pressure by a finger whereas a stylus pen can just lay on the screen to perform the contact with screen. In any cases, the special feature of sensing the touch by a finger keeps the multilayer touchscreen in today's market and probably in some special applications in the future too. Therefore, in according with present invention, a secondary embodiment of multilayer touchscreen is disclosed.

In all the resistive touch sensors, single layer or multilayer, the potential field is alternately switched between vertical equipotentials and horizontal equipotentials in synchronism with the detection circuit to provide an X analog signal output and a Y analog output representative of the horizontal and vertical coordinates, respectively of the touch tip above the sensor. This switching mechanism not only delays the touch response but also increases the system complexity as well as the cost. The delay in touch response is a major drawback in hand writing application.

SUMMARY OF THE INVENTION

This invention in its simplest form utilizes a single substrate having an uniform high and low resistive coating on the top and the bottom surfaces of substrate respectively. Four conductive strips are bonded along each of the four edges of substrate, with each pairs of parallel strips being in electrical contact with the top and bottom resistive coating respectively. A d. c. voltage is applied between the parallel conductive strips connecting to the resistive coating on top surface. At the same time, an a. c. voltage is applied between the parallel conductive strips connecting to the resistive coating on bottom surface. A moveable conductive probe is provided to contact the resistive coating on top surface at a selected point, or series of points, whereby both d. c. and a. c. voltage signals are derived between the point of contact and a reference potential, that is accurately proportional to the x- and y-coordinates of the point or points. Further in according with this invention, a secondary embodiment with a flexible resistive sheet replacing the conductive probe is also disclosed.

An object of the present invention is to provide a resistive touch sensor without using any switching circuits to detect x- and y-coordinates.

Another object of the present invention is to construct an inexpensive resistive touchscreen in which minimal border areas are required.

Yet another object of the invention is to utilize the top and bottom surfaces of substrate to sense the X and Y coordinates of touch position separately as to substantially overcome nonlinearity within the resistive plane.

Other objects, advantages and novel features of the present invention will be apparent from the following description of the preferred embodiment taken in conjunction with the accompanying drawings.

BRIEF DESCRIPTION OF THE DRAWINGS

FIG. 1 is a top view of a first embodiment of the touch position sensor in according with present invention;

FIG. 2 is a bottom view of a first embodiment of the touch position sensor in according with present invention;

DETAILED DESCRIPTION OF THE PREFERRED EMBODIMENT

Figure 3:
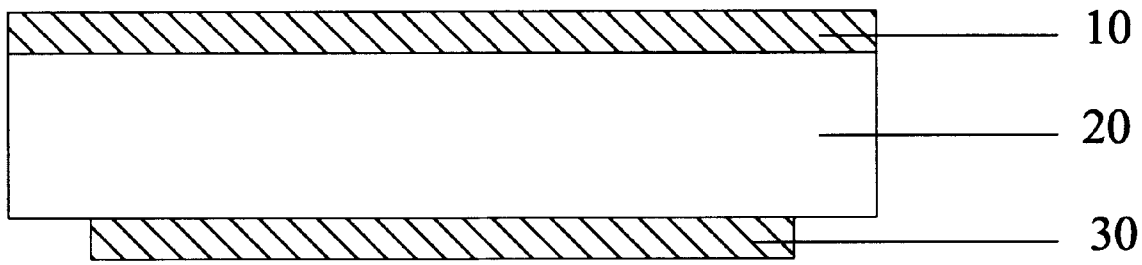
FIG. 3 is the cross sectional view of a second embodiment of the touch position sensor in according with present invention.
Figure 4:
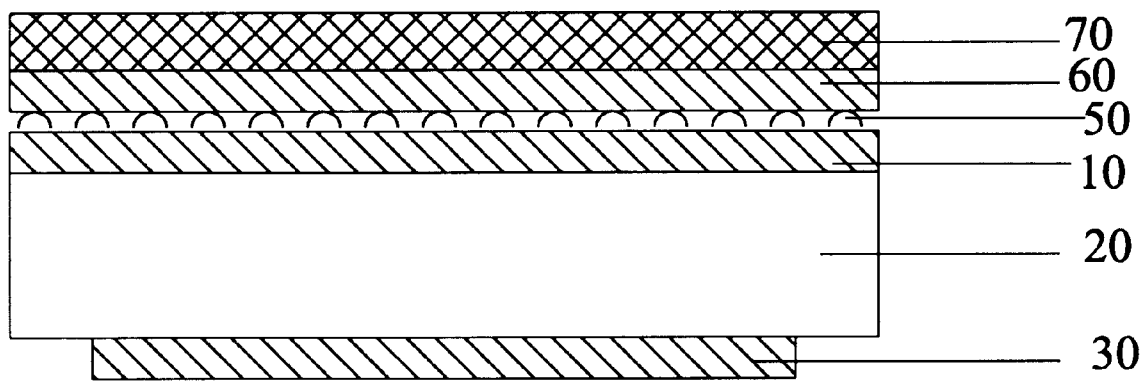
FIG. 4 is the cross sectional view of a second embodiment of the touch position sensor in according with present invention.

Shown in FIG. 1 is a top view of a first embodiment 8 constructed according to the present invention. A uniform resistive coating 30 having resistance of $\rho_t$ (said 4,000 ohms per square) is suitably coated or mounted by any conventional means to the top surface 10 of a substrate 12. The resistive coating 30 is preferred to cover the entire top surface 10 as to minimize the border areas. A pair of parallel conductive strips 22 and 26 are bonded at the edges of the substrate 12 or on the top surface 10 (not shown). This pair of conductive strips 22 and 26 are electrically in contact with the resistive coating 30. Shown in FIG. 2 is a bottom view of the first embodiment 8 constructed according to the present invention. A uniform resistive 40 having resistance of $\rho_b$ (said 200 ohms per square) is suitably coated or mounted by any conventional means to the bottom surface 20 of a substrate 12. The resistive coating 40 cover the bottom surface 20 except the small areas 21 and 25. The size d of uncovered areas 21 and 25 is given by:

$$d \geq (\rho_b L)/(2\rho_t)$$

where L and d are defined in FIG. 2. This equation ensures the linearity of the bottom voltage field as explained later. A pair of parallel conductive strips 24 and 28 are bonded at the edges of the substrate 12 or on the top surface 20 (not shown). This pair of conductive strips 22 and 26 are electrically in contact with the resistive coating 40.

During the operation, an a. c. voltage field is applied to the parallel conductive strips 24 and 28 to create an a. c. voltage potential field on the bottom surface 20 of substrate 12 along the Y direction. This a. c. voltage potential field is capacitively coupled to the top surface 10. The low resistance 40 on the bottom surface 20 dominates the high resistance 30 on the top surface 10 in the overlapping area. The unoverlap area 21 and 25 with distance d remains high resistance area so as to eliminate the shunting of equipotential lines by the conductive strips 22 and 24. Returning to FIG. 1, while an a. c. voltage is applied to conductive strips 24 and 28 to crease an a. c. voltage potential field on the top surface 10 along Y direction, a d. c. voltage is applied to the parallel conductive strips 22 and 26 to produce a d. c. voltage potential field on the top surface 10 along the X direction. This invention takes advantage that a d. c. voltage potential field on the top surface 10 does not couple into the bottom surface 20, therefore the conductive strips 24 and 28 do not distort the d. c. field on the top surface 10. Two adjacent conductive strips, for example, 26 and 28 can be connected together as the ground potential for both a. c. and d. c. voltages potential field. With both orthogonal d. c. and a. c. voltage potential field on the top surface 10 linearly proportional to the X and Y coordinates of a point or points, a movable conductive probe 50 will pick up both d. c. and a. c. voltages at the same time when the tip 55 touches the surface 10 of the substrate 12. The output signals of conductive probe 50 for electrically contacting the top surface of the resistive material 30 at a point whose x and y coordinates are to be determined, are responsive to a potential difference between the contacted point on the resistive material 30 and the ground conductive strips 26 and 28. A simple filter circuit is used to separate the a. c. and d. c. signals in the detection circuitry whereby electrical output signals are accurately related to the x and y coordinates of the contacted point on the resistive material 30.

In case of a curved display such as cathode ray tube (CRT), the present invention of touchscreen can be easily adapted to curved substrate. The curved substrate is cut along the line of longitude so that the projection of curved substrate is a rectangular. Then FIGS. 1 and 2 become the projection view of the preferred embodiment with curved substrate. The equipotential line follows the great circle line (the line of latitude in this case) between the edges, which are lines of latitude. This configuration allows minimum distortions due to curved substrate.

FIG. 3 is the cross sectional view of a second embodiment in according with present invention. The second embodiment is constructed with first embodiment as described above plus a flexible transparent resistive sheet 70 and some insulation spacers 60. The flexible sheet 70 with resistance about 4000 ohms per square is electrically connected to the detection circuitry by a wire similar to the one 45 in FIG. 1. This flexible sheet 70 is placed above the resistive coating surface 30 in the first embodiment with the insulation spacers 60 therebetween. A localized pressure applied to the surface of flexible resistive sheet 70 will bring about contact of the flexible resistive sheet 70 and the resistive coating surface 30 immediately below the point of pressure. For this construction, a plastic resistive sheet is suitable. This flexible resistive sheet 70 functions like the conductive probe 50 as shown in FIG. 1. Although the plastic has a resistance of about 4,000 ohms per square, this is not deleterious as the input resistance of most measuring devices is typically much larger, e.g., $10^8$–$10^9$ ohms. Further the resistive uniformity of sheet 70 can be low because the resistive sheet 70 is used for conducting purpose only.

Inasmuch as the present invention is subject to many variations, modifications and changes in detail, it is intended that all the material in the foregoing specification or in the accompanying drawings should be interpreted in an illustrative, not in a limiting sense.

What is claimed is:

1. A sensor comprising:

a substrate having a top surface, a bottom surface and four edges, means for providing uniform resistive materials on most of the top and bottom surfaces, four edges connecting means for joining the respective pairs of conductive strips to the respective edges, means for connecting the opposed strips to the resistive material on the top surface or bottom surface, means for applying d. c. and a. c. voltage to the top and bottom surfaces of said substrate respectively at the same time.

2. A sensor as recited in claim 1 wherein said substrate is formed of glass.

3. A sensor as recited in claim 1 wherein said substrate is formed of plastic.

4. A sensor as recited in claim 1 wherein said substrate is curved.

5. The sensor of claim 1 further comprising:

a conductive probe for electrically contacting the top surface of the resistive material at a point whose x and y planar coordinates are to be determined; and output from connecting between the conductive probe and ground conductive strips being responsive to a potential difference between the ground conductive strip and the contacted point on the resistive material whereby electrical output signals are accurately related to the x and y coordinates of the contacted point on the resistive material.

6. A sensor comprising:

a substrate having a top surface, a bottom surface and four edges, means to provide uniform resistive materials on most of the top and bottom surfaces, four edges connecting means joining the respective pairs of conductive strips to the respective edges, said means to connect the opposed strips to the resistive material on the top surface or bottom surface, a flexible resistive sheet spacing from the top resistive surface of substrate means for insulation, but depression means for electrically contacting of said the flexible resistive sheet and the top resistive surface of the substrate, means to apply d. c. and a. c. voltage to the top and bottom surfaces respectively at the same time.

7. A sensor as recited in claim 1 wherein said substrate is formed of glass.

8. A sensor as recited in claim 1 wherein said substrate is formed of plastic.

9. A sensor as recited in claim 1 wherein said substrate is curved.

* * * * *